May 12, 1925.
G. W. SPONABLE
GEAR LAPPING MACHINE
Filed March 20, 1923
1,537,626
3 Sheets-Sheet 2
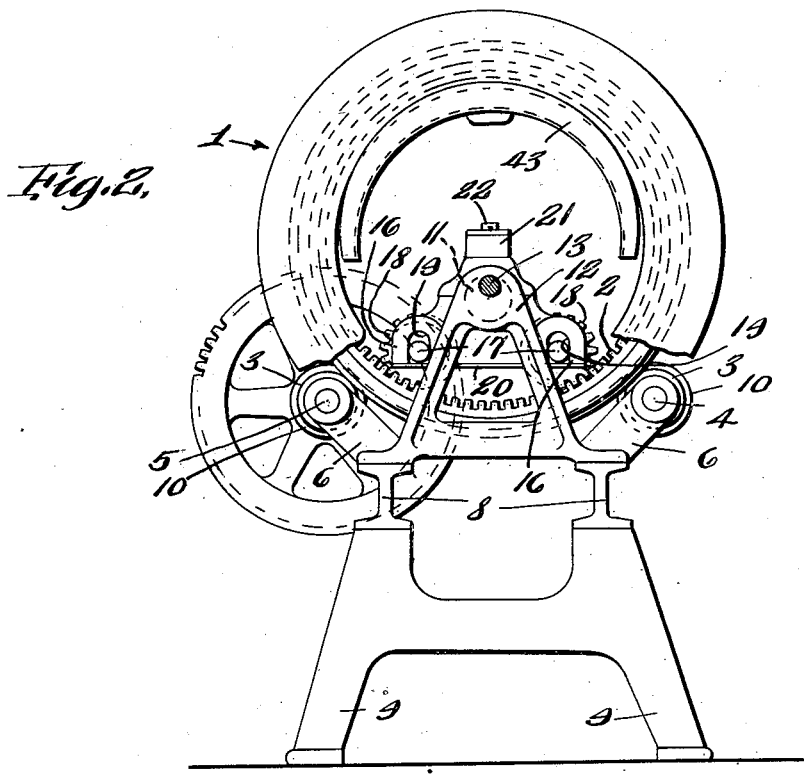
Fig. 2.
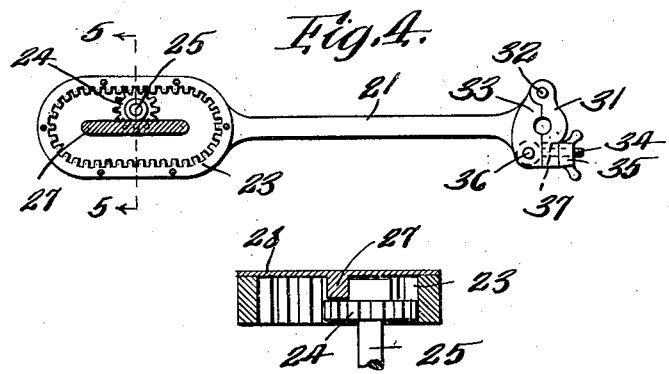
Fig. 4.
Fig. 5.
George W. Sponable, INVENTOR.
BY
Sawyer & Brodell, ATTORNEYS.

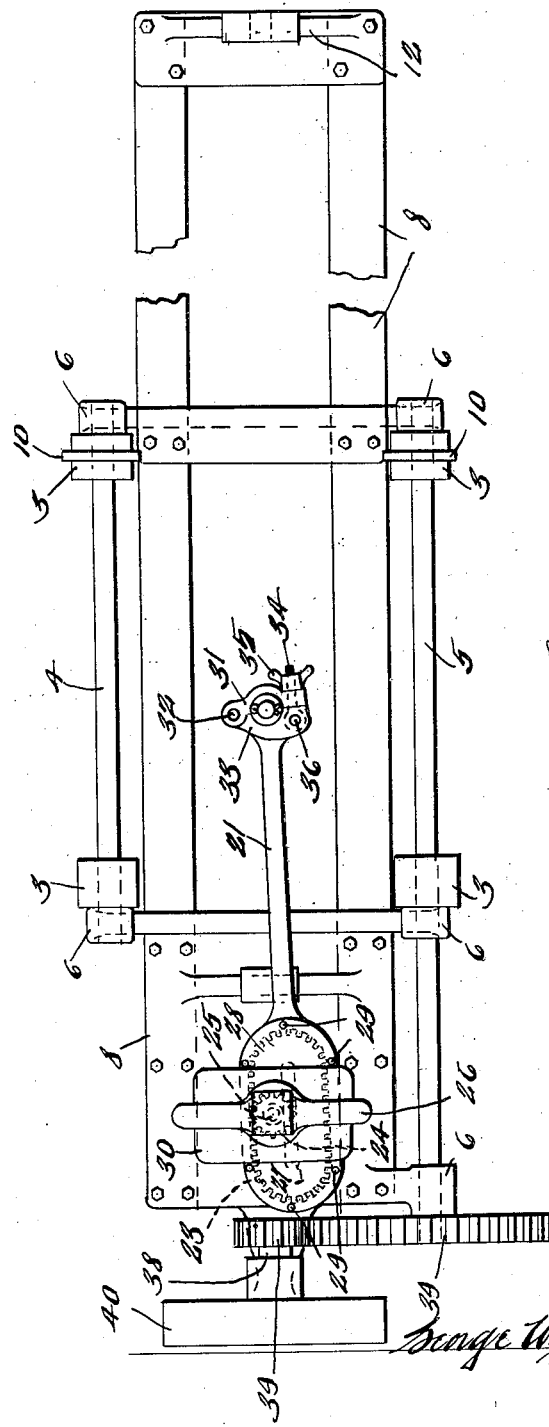

Patented May 12, 1925.

1,537,626

UNITED STATES PATENT OFFICE.

GEORGE W. SPONABLE, OF SYRACUSE, NEW YORK, ASSIGNOR TO BROWN-LIPE GEAR COMPANY, OF SYRACUSE, NEW YORK, A CORPORATION OF NEW YORK.

GEAR-LAPPING MACHINE.

Application filed March 20, 1923. Serial No. 626,360.

*To all whom it may concern:*

Be it known that I, GEORGE W. SPONABLE, a resident of Syracuse, in the county of Onondaga and State of New York, have invented a certain new and useful Gear-Lapping Machine, of which the following is a specification.

This invention has for its object a gear lapping machine, which is particularly simple in construction, and highly efficient and rapid in operation, and it consists in the novel features and in the combinations and constructions hereinafter set forth and claimed.

In describing this invention, reference is had to the accompanying drawngs in which like characters designate corresponding parts in all the views.

Figures 1 and 2 are respectively, a side and end elevation of this machine, partly broken away.

Figure 3 is a plan view, the drum and gear carriage and its support being removed.

Figure 4 is a detail view of a portion of the actuating mechanism for the gear carriage.

Figure 5 is a sectional view on line 5—5, Fig. 4.

Figure 1:
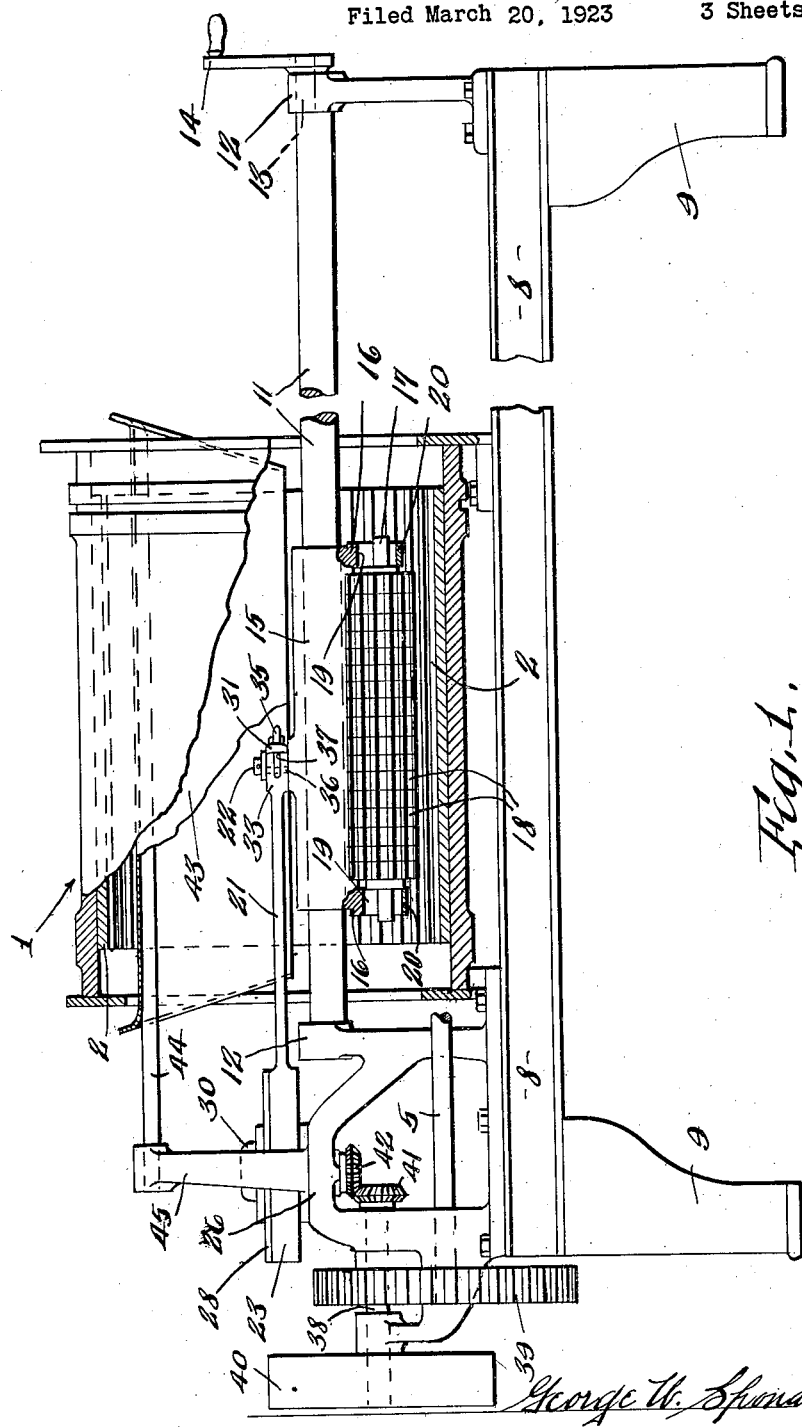

This gear lapping machine comprises generally, a rack support in the form of a cylinder or drum, a cylindrical rack carried thereby, a gear carriage for the gear while in mesh with the rack, and means for effecting relative rotation of the rack and the gear carriage and also preferably relative axial or reciprocating sliding movements of the rack and gear carriage in the direction lengthwise of the rack teeth.

The machine further preferably comprises means for shifting the gear carriage to carry the gear from and toward the rack out of and into mesh with the same in order that the gears may if desired, be turned on their axes while out of mesh with the rack.

In the illustrated embodiment of this invention, the rack has internal annular teeth and is mounted on the inner face of the drum so that the drum is practically an internal gear, and such drum is mounted to rotate; the gear carriage extends into the drum and is shiftable completely out of drum to place and remove the gears, and it is also reciprocally movable intermittently or constantly in the drum while the drum is rotating. The drum is here shown as arranged in horizontal position but may be arranged vertically or in any other desired position. Also, the teeth of the rack are parallel to the axis of the drum but for lapping spiral or helical gears the teeth may be spiral.

1 designates the rack carriage or drum and 2 the internal annular rack arranged with its teeth extending parallel to the axis of the drum, the rack being usually detachable from the drum. The drum is, in this embodiment of my invention, arranged in horizontal direction and is rotatably supported on rotating members as rollers 3 engaging trucks on the periphery of the drum, the rollers being located on opposite sides of the lower portion of the drum. The rollers 3 are shown as mounted on shafts 4, 5 carried by brackets 6 supported on opposite sides of the main frame 7. This main frame may be of any suitable form, size and construction, and includes a bed 8 supported on legs 9.

One of the shafts 4, 5 as the shaft 5 is connected to actuating mechanism for rotating it and hence rotating the drum 1. One or more of the rollers 3 may be formed with an annular flange 10 running in a circumferential groove in the track in the drum for preventing endwise movement of the drum.

11 is the gear carriage support, it being here illustrated as a shaft extending through the drum and supported at its ends in standards or brackets 12 rising from the bed 8, this shaft extending beyond one end of the drum far enough to permit the gear carriage to be removed endwisely out of the drum by being slid along the shaft to permit the gears to be placed on and removed from the gear carriage.

The gear carriage support 11 may be provided with a suitable handle or other means by which it is so moved along the gear carriage support or shaft 11. The shaft 11 is a rocking cam shaft mounted eccentrically in its bearings in the standards 12, the shaft having eccentric axles or trunnions 13 at its ends journaled in the standards.

The shaft 11 may be rocked by a suitable crank 14 at one end thereof.

15 is the gear carriage, said carriage comprising a body or sleeve slidably mounted on the shaft 11 and having arms or brackets 16 for supporting one or more mandrels or arbors 17 on which the gears 18 are mounted.

As here illustrated, the gear carriage 15 is constructed to support two of such arbors. Each arm 16 is provided with a slot 19 extending in a direction toward the portion of the rack with which the gears are engaged as the lower portion, such slot being of sufficient length to permit the arbors to play toward and from the rack, that is, up and down in the machine here illustrated.

The lower or outer ends of the slots 19 are open to permit the insertion and removal of the arbors or mandrels and these open ended slots are normally closed by suitable retaining plates 20 extending across the open ends thereof.

The plates prevent displacement of the arbors while the gear carriage is being moved into and out of the frame 1 and also during lifting of the gear carriage by turning the rock or cam shaft by the handle 14, this shaft being rockably mounted on said body or sleeve of the gear carriage.

When the stem gears are being lapped suitable means for supporting the stems or axles of the gears are located in the slots 1f. The gear carriage 15 is reciprocated intermittently or constantly during rotation of the drum by suitable means here illustrated as consisting of a pitman or connecting rod 21 pivoted at one end on a stud 22 on the carriage 15, and having its other end connected to actuating mechanism to receive a reciprocating motion therefrom. As here illustrated, in Fig. 4, the connecting rod is provided with the internal oblong rack 23 for meshing with the gear 24 mounted on a vertical shaft 25 supported in the bracket 26 rising from the frame bed. The gear 24 is guided from one side or run of the oblong rack 23 to the other and held in mesh with the rack 33 by a guide plate or flange 27 extending midway between the opposite long sides or runs of the oblong rack and terminating short of the ends of such rack, the hub of the gear thrusting against the flange.

The flange 27 is here shown as depending from a plate 28 secured to the oblong rack as by screws 29 and forming a cover for the same. The connecting rod 21 is held from displacement off the gear 24 by suitable means as a plate 30 secured at its ends to the frame and having its intermediate portion overlying the oblong rack or the plate 28 thereon.

Obviously, during rotation of the gear 24 it will while meshing with one side of the oblong rack 23 move the connecting rod 21 in one direction and when one end or the other of the guide flange 28 reaches the gear 24 the gear will by reason of its rotation transfer from one side of the flange to the other while meshing with the teeth at the ends of the oblong rack and hence transfer from one long side of the oblong rack to the other and move the connecting rod in the reverse direction. Any other suitable mechanism may be used for actuating the connecting rod or the gear carriage.

The pitman 21 is disconnectible from the stud 22 to permit the gear carriage to be disconnected from the actuating mechanism in order that the carriage may be shifted along the shaft 11 entirely out of the drum for the purpose of removing the finished gears and placing other gears to be lapped on the carriage.

As illustrated, the bearing of the connecting rod 21 on the stud 22 comprises a displaceable section 31 pivoted at 32 to the fixed section 33 of the bearing on one side of the stud and detachably secured to such section 33, on the opposite side of the stud as by a bolt 34 and wing nut 35, the bolt being pivoted at 36 to the fixed section and movable on its pivot into and out of open ended slot or fork 37 on the pivoted section 31. The shaft 5 for rotating the drum 1 is connected to a drive shaft 38 journaled in the frame through suitable gearing 39. This shaft 38 has means as a pulley 40 for connection to power.

The shaft 25 is connected to the drive shaft 38 in any suitable manner, here shown as through bevel gears 41, 42 mounted respectively on the drive shaft 38 and shaft 25.

A lapping or grinding compound is usually applied and in order to prevent such compound from dripping on the gear carriage and for directing it on the lower side of the rack a drip pan 43 is supported in the upper portion of the drum, it being here shown as arc shaped and supported by a rod 44 extending horizontally into the drum and secured at one end outside of the drum to a standard 45 rising from the bracket 26. The machine may be provided with suitable starting and stopping mechanisms and if desired with reversing mechanism.

In operation, the gear carriage is moved along the shaft 11 until it is entirely out of the drum, the gears mounted in the carriage. The carriage is then moved back into the drum and if necessary to cause the gears to be meshed with the rack, the carriage 15 is raised by rocking the shaft 11 by means of the crank 14 and the gears turned if necessary, until their teeth register with the spaces of the rack teeth, and then lowering the carriage by again turning the shaft 11.

The machine is then started so that the drum rotates and the gear carriage reciprocates effecting the lapping of the gears. The gear carriage may be raised at suitable intervals by turning the shaft 14 and the gears shifted about their axes to change the position of the gears relatively to the rack teeth. If desired, the reciprocating movement of the carriage may be dispensed with.

What I claim is:

1. In a gear lapping machine, the combination of a rack carriage comprising a drum, a gear carriage constructed to mount an unlapped gear and hold it in mesh with the rack, and means for effecting relative rotation of the drum and the gear carriage, substantially as and for the purpose described.

2. In a gear lapping machine, the combination of a rack carriage comprising a drum, a gear carriage constructed to mount an unlapped gear and hold it in mesh with the rack, means for effecting relative rotation of the drum and the gear carriage, and means for effecting relative axial movement of the drum and the gear carriage, substantially as and for the purpose specified.

3. In a gear lapping machine, the combination of a rack carriage comprising a drum having a cylindrical internal annular rack on the inner face thereof, a gear carriage constructed to mount an unlapped gear and hold it in mesh with the rack, and means for effecting relative rotative movement of the drum and the gear carriage, substantially as and for the purpose set forth.

4. In a gear lapping machine, the combination of a rack carriage comprising a drum having a cylindrical internal annular rack on the inner face thereof, a gear carriage constructed to mount an unlapped gear and hold it in mesh with the rack, and means for effecting relative rotative and relative axial movements of the drum and the gear carriage, substantially as and for the purpose described.

5. In a gear lapping machine, the combination of a rack carriage comprising a rotatable drum having an internal annular rack on its inner face, a gear carriage constructed to mount an unlapped gear and hold it in mesh with the rack, and means for rotating the drum, substantially as and for the purpose specified.

6. In a gear lapping machine, the combination of a rack carriage comprising a rotatable drum having an internal annular rack on its inner face, a gear carriage constructed to mount an unlapped gear and hold it in mesh with the rack, means for rotating the drum, said gear carriage being shiftable in a direction axially of the drum, and means for reciprocating the gear carriage, substantially as and for the purpose set forth.

7. In a gear lapping machine, the combination of a rack carriage, a gear carriage constructed to mount an unlapped gear and hold it in mesh with the rack, means for effecting relative movement of the rack and the gear carriage in a direction transversely of the axis of the gear, and means for moving the gear carriage toward and from the rack to carry the gear into and out of mesh with the rack, substantially as and for the purpose described.

8. In a gear lapping machine, the combination of a rack carriage comprising a drum, an internal annular rack on the inner face of the drum, a gear carriage constructed to mount an unlapped gear and hold it in mesh with the rack, means for effecting relative rotation of the drum and gear carriage, said gear carriage being shiftable toward and from the rack to move the gear into and out of mesh with the rack, and means for effecting such shifting of the rack, substantially as and for the purpose specified.

9. In a gear lapping machine, the combination of a rack carriage comprising a drum, an internal annular rack on the inner face of the drum, a support extending through the drum, a gear carriage slidably mounted on the support and shiftable along the same into and out of the drum, and means for rotating the drum, substantially as and for the purpose set forth.

10. In a gear lapping machine, the combination of a rack carriage comprising a drum, an internal annular rack on the inner face of the drum, a support extending through the drum, a gear carriage slidably mounted on the support and shiftable along the same into and out of the drum, means for rotating the drum, and means for reciprocating the gear carriage along its support when said carriage is in the drum, substantially as and for the purpose described.

11. In a gear lapping machine, the combination of a rack carriage comprising a drum, an internal annular rack on the inner face of the drum, a support extending through the drum, a gear carriage slidably mounted on the support and shiftable along the same into and out of the drum, means for rotating the drum, the gear carriage and the support being operable to shift the gear carriage to carry the gear into and out of mesh with the rack, and means for shifting the support, substantially as and for the purpose specified.

12. In a gear lapping machine, the combination of a rack carriage comprising a drum, an internal annular rack on the inner face of the drum, a support extending through the drum, a gear carriage slidably mounted on the support and shiftable along the same into and out of the drum, means for rotating the drum, means for reciprocating the gear carriage along its support when said carriage is in the drum, the gear carriage support being operable to shift the gear carriage to carry the gear into and out of mesh with the rack, and means for shifting said support, substantially as and for the purpose set forth.

13. In a gear lapping machine, the combination of a rack carriage, a gear carriage constructed to mount an unlapped gear and hold it in mesh with the rack, means for effecting relative movement of the rack and gear carriages in a direction transversely of the axis of the gear, a gear carriage support comprising an eccentrically mounted rock shaft, the gear carriage having a body slidable on the support, and the shaft being rockably mounted in the body, and means for rocking the shaft to carry the gear into and out of mesh with the rack, substantially as and for the purpose described.

14. In a gear lapping machine, the combination of a rack carriage, a gear carriage constructed to mount an unlapped gear and hold it in mesh with the rack, means for effecting relative movement of the rack and gear carriages in a direction transversely of the axis of the gear, a gear carriage support comprising an eccentrically mounted rock shaft, the gear carriage having a body slidable on the support, and the shaft being rockably mounted in the body, means for reciprocating the gear carriage along the rack, and means for rocking the shaft, substantially as and for the purpose specified.

15. In a gear lapping machine, the combination of a frame, a drum rotatably mounted on the frame and having an internal annular rack, a support extending through the drum, a gear carriage slidable on the support, means for rotating the drum, and means for reciprocating the gear carriage, substantially as and for the purpose set forth.

16. In a gear lapping machine, the combination of a frame, a drum rotatably mounted on the frame and having an internal annular rack, an eccentrically mounted rock shaft carried by the frame and extending through the drum, a gear carriage having a body slidable on the rock shaft and the shaft being rockably mounted on the body, said shaft extending outside of the drum to permit the gear carriage to be shifted along the same to the outside of the drum, means for rotating the drum, means for reciprocating the gear carriage when in the drum lengthwise of the shaft including a part disconnectible from the carriage, and means for rocking the shaft to carry the gear into and out of mesh with the rack, substantially as and for the purpose described.

In testimony whereof, I have hereunto signed my name, at Syracuse, in the county of Onondaga, and State of New York, this 9th day of March, 1923.

GEORGE W. SPONABLE.